United States Patent Office 3,491,167
Patented Jan. 20, 1970

3,491,167
COMPOSITIONS OF ETHYLENE-PROPYLENE POLYMERS
Anthony C. Soldatos, Kendall Park, N.J., assignor to Union Carbide Corporation, a corporation of New York
No Drawing. Filed Aug. 17, 1966, Ser. No. 572,912
Int. Cl. C08f 37/16, 37/18
U.S. Cl. 260—889         17 Claims

ABSTRACT OF THE DISCLOSURE

Tack of ethylene/propylene rubber is improved by blending therewith minor amounts of an isoprene polymer having a member average molecular weight of about 500–30,000 and containing less than about 50 percent by weight internal unsaturation.

---

This invention relates to compositions of ethylene-propylene polymers which can be cured to elastomeric products. More particularly, this invention relates to compositions of polymers of ethylene-propylene which, being characterized by improved physical properties such as improved "tack," can be successfully used in the production of automobile tires on a commercial scale.

In recent years, ethylene-propylene polymers, which can be cured to elastomeric products, by reason of their excellent chemical resistivity, their excellent weathering characteristics and other such properties, have found increased use in the production of conveyer belts, coated fabrics and the like. Although finding increased use in such applications, polymers of ethylene-propylene have found only limited use in the production of automobile tires. These polymers do not possess sufficient tack to be used in the production of automobile tires on a commercial scale.

In the production of automobile tires, relatively thin plies of rubber stock are "laid-up" one on top of the other to form a structure of desired dimension which is subsequently cured to the elastomeric state. It is necessary, in the process described, that the rubber stock have sufficient tack, that is, must be strongly self-adhering in order that the plies remain in their assembled position until cured.

Attempts to improve the tack of ethylene-propylene polymers, as for example, by the addition thereto of various additives, have not proved to be particularly successful. For instance, it has been proposed to add to these polymers such additives as alkylated phenol-formaldehyde resins. These and other comparable additives have not materially improved the tack of ethylene-propylene polymers to the extent of allowing these polymers to be successfully used in the production of automobile tires. In addition, some of these additives have significantly lowered the tensile strength and tensile modulus of the ethylene-propylene polymers to which they have been added.

The present invention provides compositions of ethylene-propylene polymers which have sufficient tack to be used successfully in the production of automobile tires on a commercial scale. Also, the compositions of this invention retain their tack for periods of time greater than about thirty days. Furthermore, these compositions possess excellent cohesive or green strength which helps insure that, when stock formed from these compositions is pressed into contact, one with another, there is no failure or fracture of material on either side of the adhesive bond prior to the curing step.

The compositions of this invention comprise ethylene-propylene polymers in admixture with polymers of isoprene or in admixture with phenolated polymers of isoprene.

Particularly desirable for purposes of this invention are compositions comprising ethylene-propylene polymers in admixture with phenolated polymers of isoprene. These compositions, in addition to possessing a high degree of tack, retain this property for extended periods of time.

Illustrative of polymers of isoprene which are utilized per se or which are phenolated are homopolymers of isoprene which generally have a number average molecular weight of about 500 to about 30,000, preferably a number average molecular weight of about 500 to about 10,000 and more preferably have a number average molecular weight of about 1000 to about 8000; and which contain less than about 50 percent by weight and preferably less than about 20 percent by weight internal unsaturation (based on the weight of the total unsaturation).

Number average molecular weight was determined by vapor phase osmometry.

Total unsaturation was determined by Wijs method (modified by correcting for substitution reactions).

Internal unsaturation was determined by nuclear magnetic resonance and infra-red analysis.

Internal unsaturation as used herein refers to unsaturated units which make-up the backbone of the polymer as opposed to pendant unsaturated units.

For instance, internal unsaturation with respect to isoprene refers to the percent by weight of the diene units of isoprene (2-methyl butadiene-1,3) which have combined at the 1,4 position as opposed to the 1,2 and 3,4 positions.

1,4-position 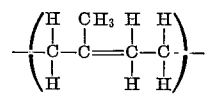

1,2-position 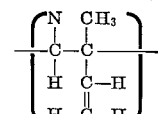

3,4-position 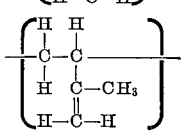

It is to be understood that homopolymers of isoprene as used herein is intended to include halogenated, hydrogenated and other like homopolymers of isoprene.

Preparation of polymers of isoprene, particularly homopolymers of isoprene, having the number average molecular weight and the unsaturation previously described can be conducted as described in this application and also as described in the following articles:

Quarterly Review, vol. 16, 1962, p. 361, "Stereo Regular Addition Polymerization," C. F. H. Bawan and A. Ledwith
Journal of Polymer Science, vol. 3, 1965, pp. 2223–28, "Solvent Effects in Anionic Copolymerization Reactivity of Dienes," K. F. O'Driscoll
Journal of Polymer Science, vol. 27, 1957, "Polymerization of Isoprene with Lithium Dispersions and Lithium Alkyls Using Tetrahydrofuran As Solvent," Henry Hsieh, D. J. Kelly, A. V. Tobolsky
Journal of Polymer Science, vol. 40, 1959, pp. 73–89, "Isoprene Polymerization by Organometallic Compounds," A. V. Tobolsky, C. E. Rogers Among other suitable polymers of isoprene are those obtained by polymerizing isoprene with one or more of a compound having at least one olefinic double bond to obtain a copolymer or interpolymer having the number average molecular weight and the internal unsaturation previously defined and containing at least about 70 percent by weight combined isoprene. Exemplary of suitable monomers having at least one olefinic double bond are described subsequently in this application. These polymers can be hydrogenated, halogenated and the like, as previously described.

Illustrative of phenols which can be reacted with a polymer of isoprene to produce phenolated polymers of isoprene are those compounds which have the formula:

$$R(OH)_n$$

wherein R is an aromatic hydrocarbon radical generally containing a maximum of 31 carbon atoms and preferably containing a maximum of 21 carbon atoms and $n$ is an integer having a value of 1 to 3 inclusive.

Especially desirable phenols are those having the formula:

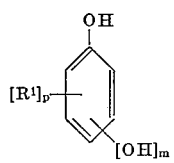

wherein each $R^1$, which can be the same or different, is an alkyl radical generally containing a maximum of 25 carbon atoms and preferably containing a maximum of 15 carbon atoms, an alkoxy radical generally containing a maximum of 25 carbon atoms and preferably containing a maximum of 15 carbon atoms, a cycloaliphatic radical generally containing a maximum of 25 carbon atoms and preferably containing a maximum of 12 carbon atoms, nitro, sulfone, sulfur, or halogen, i.e., chlorine, bromine, fluorine or iodine; $p$ is an integer having a value of 0 to 5 inclusive, $m$ is an integer having a value of 0 to 3 inclusive and the maximum sum of $p+m=5$.

Illustrative of suitable phenols are the following: phenol, nitrophenol, thiophenol, alkylated phenols such as m-cresol, o-ethyl phenol, m-ethyl phenol, p-isopropyl phenol, p-tert-butyl phenol, o-amyl phenol, p-n-hexyl phenol, p-nonyl phenol, p-octyl phenol, o-nonyl phenol, p-dodecyl phenol, o-dodecyl phenol, 2,6-di-nonyl phenol, 2,4-diethyl phenol, 2,4-di-n-hexyl phenol, 2,4-dinonyl phenol, 2,4-didodecyl phenol, 2,3,5-triethyl phenol, 2,3,5-trihexyl phenol, 2,3,4,5-tetra-n-hexyl phenol and other like phenols, as well as the commercially available meta-cresol which contains small amounts of both the para and the ortho isomers; alkoxylated phenols, exemplary of which are m-methoxy phenol, o-methoxy phenol, p-methoxy phenol, m-n-hexoxy phenol, o-n-hexoxy phenol, p-n-hexoxy phenol, 2,4-dimethoxy phenol, 2,4-di-n-hexoxy phenol, 2,3,5-trimethoxy phenol, 2,3,5-tri-n-hexoxy phenol, 2,3,4,5-tetra-n-hexoxy phenol and the like; halogenated phenols such as ortho, meta or para bromo phenol, 2,4-dichlorophenol and 2,3,5-trichlorophenol, 3-chloro-4-methyl phenol, 4-bromo-6-ethoxy phenol and the like; styryl phenol, cymyl phenol, α-methyl styryl phenol and the like; polyhydric phenols such as pyrocatechol, hydroquinone, resorcinol and the like; alkylated dihydroxy phenols such as 1,3-dihydroxy-4-methylbenzene, 1,2-dihydroxy-4-hexylbenzene and the like; alkoxylated dihydroxy phenols such as 1,4-dihydroxy-3-n-hexoxybenzene and the like; cycloaliphatic phenols such as p-cyclopentyl phenol, p-cyclopentenyl phenol and the like; halogenated dihydroxy phenols such as 1,2-dihydroxy-4-chlorobenzene and the like; trihydric phenols such as phloroglucinol, pyrogallol and the like; polynuclear phenols such as 2,2-bis(p-hydroxyphenyl)-propane and the like.

As a general rule, the phenolated polymers of isoprene contain about 5 to about 75 percent by weight and preferably about 10 to about 40 percent by weight combined phenol based on the total weight of the polymer.

Phenolated polymers of isoprene can be prepared as described in this application and also as described in U.S. Patent 3,177,166, issued Apr. 6, 1965 to J. T. Gregory et al.

Suitable ethylene-propylene polymers for this invention are those which can be cured to elastomeric products. Among such suitable polymers are the copolymers and interpolymers containing at least about 20 percent by weight combined ethylene, preferably about 20 to about 80 percent by weight combined ethylene and at least about 20 percent by weight combined propylene.

Among suitable polymers, as previously stated, are copolymers of ethylene-propylene and interpolymers of ethylene-propylene and a polymerizable monomer having at least one olefinic double bond wherein, in each case, the combined ethylene and combined propylene are as defined above.

Illustrative of suitable mono-olefinic compounds are those having the formula:

$$R^2-CH=CH_2$$

wherein $R^2$ is a monovalent hydrocarbon radical generally containing a maximum of 10 carbon atoms and preferably containing a maximum of 8 carbon atoms. Among such monovalent hydrocarbon radicals are the alkyl radicals such as ethyl, n-propyl, n-hexyl, 2-ethylhexyl and the like; aromatic radicals such as phenyl, naphthyl and the like; cycloaliphatic radicals such as cyclohexyl, n-propyl cyclohexyl and the like.

Methods for preparing copolymers of ethylene-propylene and interpolymers of ethylene-propylene and a monoolefinic compound are described in detail in U.S. Patents 3,000,867 to B. S. Fisher and 2,975,159 to V. Weinmayr respectively.

Suitable diene monomers which can be used to produce interpolymers and methods for polymerizing these diene monomers with ethylene and propylene are described in U.S. Patents 3,000,866 to R. E. Tarney and 3,211,709 to S. Adamek et al.

Especially desirable diene monomers are hexadiene-1,4 dicyclopentadiene, ethylene bicycloheptadiene and the like.

The polymers of isoprene, as described, are added to the ethylene-propylene polymers in amounts sufficient to improve the tack thereof. As a rule, this amount ranges from about 8 to about 100 percent by weight isoprene polymer based on the weight of ethylene-propylene polymer. Particularly effective results are achieved using from about 12 to about 20 percent by weight isoprene polymer based on the weight of the ethylene-propylene polymer.

It is to be understood that mixtures of isoprene polymers and/or mixtures of ethylene-propylene polymers can be used if so desired. The addition of one to the other can be carried out in a two-roll mill, a Banbury or a twin screw extruder.

To the compositions of this invention can be added pigments, fillers, lubricants, plasticizers, curing agents, accelerators, stabilizers, antioxidants and the like as is well-known in the art. Specific additives are pigments such as carbon black and clay; lubricants such as stearic acid and plasticizers such as naphthenic oils.

In those instances wherein the compositions of this invention contain a polymer of ethylene-propylene which is devoid of olefinic unsaturation, for instance, a copolymer of ethylene and propylene, or an interpolymer of ethylene-propylene and a monoolefinic compound, the compositions can be cured to elastomeric products using an organic peroxide such as dicumyl peroxide. In those instances wherein the polymer of ethylene-propylene contains olefinic unsaturation such as an interpolymer of ethylene-propylene and hexadiene-1,4, the compositions can be cured to elastomeric products using sulfur.

The amount of curing agent, the length of the curing cycle and the temperature thereof will depend, in each instance, upon the exact formulation of the compositions, as for example, is described in U.S. Patent 3,200,174 and also as described in this application.

In order to demonstrate the excellent "tack" possessed by the compositions of this invention, various isoprene polymers were prepared, admixed with ethylene-propylene polymers and the resultant compositions tested for "tack."

The test for tack was carried out by forming strips, one inch by six inches by ⅛ of an inch, from the compositions to be tested, pressing two such strips together using a two pound roller and then manually pulling the strips apart. "Tack" was judged on the basis of the difficulty encountered in attempting to manually separate the strips. Results reported were based on intervals of time from the time at which the compositions were formulated.

PREPARATION OF POLYMER A—POLYISOPRENE

Into a two-liter flask equipped with a stirrer, reflux condenser and dropping funnel, there was distilled 1,000 ml. of tetrahydrofuran which had been dried using lithium aluminum hydride. During this distillation the system was continuously purged with nitrogen gas. To the distilled tetrahydrofuran there was first added 0.130 mole of butyl lithium in 80 ml. of n-heptane and then 122 grams of isoprene in 6.8 gram portions over a period of one hour. During the addition of the isoprene, the temperature of the reaction mixture was maintained at 50° C.–55° C. After the addition aof the isoprene, the reaction mixture was maintained at a temperature of 60° C. for 2 hours while being constantly stirred. Methanol was added to the mixture and the product polyisoprene was recovered as the methanol insoluble portion of mixture. The polyisoprene was stabilized by adding thereto 0.05 gram of 2,6-di-t-butyl-4-methylphenol and then dried by being placed in a vacuum oven for 18 hours. The vacuum oven was at a temperature of 40° C. and was operating under a pressure of 5 mm. Hg.

Analysis:
  Number average molecular
    weight _____ 2000.
  Percent internal unsaturation _____ 5.
  Yield _____ 116 grams of a viscous liquid.

PREPARATION OF POLYMER B—PHENOLATED POLYISOPRENE

In a two-liter flask equipped with a stirrer and reflux condenser, there was charged 520 grams of p-nonylphenol and 40 grams of polyisoprene (Polymer A). To this mixture there was then added 10.4 grams of p-toluene sulfonic acid and the reaction mixture heated to a temperature of about 80° C. and maintained at this temperature for seven hours while under a nitrogen gas atmosphere. After this seven hour period, the reaction mixture was allowed to stand for 24 hours at a temperature of about 30° C. Then phenolated polyisoprene was recovered as described with respect to Polymer A.

Analysis:
  Number average molecular
    weight _____ 2600.
  Melting point _____ 92° C.–98° C.
  Percent by weight combined p-nonylphenol ___ 20 based on the total weight of the isoprene polymer.
  Percent internal unsaturation _____ 5.

PREPARATION OF POLYMER C—PHENOLATED POLYISOPRENE

Into a two-liter flask equipped with a stirrer and reflux condenser, there was charged 450 grams of phenol and 55 grams of polyisoprene (Polymer A). To this mixture there was then added 14.3 grams of p-toluene sulfonic acid and the reaction mixture was heated to a temperature of 100° C. and maintained at this temperature for one hour while under a nitrogen gas atmosphere. The reacted mixture was distilled to a pot temperature of 150° C. under a pressure of 28 mm. Hg.

Analysis:
  Number average molecular
    weight _____ 2500.
  Melting point _____ 164° C.-168° C.
  Percent by weight combined phenol _____ 16 based on the total weight of the isoprene polymer.
  Percent internal unsaturation _____ 4.

PREPARATION OF POLYMER D—PHENOLATED POLYISOPRENE

Into a two-liter flask, equipped with a stirrer and reflux condenser, there was charged 320 grams of thiophenol and 30 grams of polyisoprene. To this mixture there was then added 7.8 grams of p-toluene sulfonic acid and the reaction then conducted in a manner as described for Polymer B.

Analysis:
  Number average molecular weight _____ 3400.
  Melting point _____ 82° C.–84° C.
  Percent by weight combined thiophenol _____ 15 based on the total weight of the isoprene polymer.
  Percent internal unsaturation _____ 15.

The polyisoprene used in this example was a liquid product having a number average molecular weight of 3000 and having 15 percent internal unsaturation.

PREPARATION OF POLYMER E—PHENOLATED POLYISOPRENE

Into a two-liter flask equipped with a stirrer and reflux condenser, there was charged 1500 grams of o-t-butylphenol and 136 grams of polyisoprene (Polymer A). To this mixture there was then added 16.4 grams of boron-trifluoride phenol complex containing 23 percent by weight boron-trifluoride and the reaction then carried out in a manner described for Polymer B.

Analysis:
  Number average molecular weight _____ 2400.
  Melting point _____ 138° C.–141° C.
  Percent by weight combined o-t-butylphenol __ 21 based on the total weight of the isoprene polymer.
  Percent internal unsaturation _____ 5.

PREPARATION OF POLYMER F—HYDROGENATED POLYISOPRENE

Polyisoprene (Polymer A) was dissolved in 100 grams of hexane and the resultant solution, after the addition thereto of 5 percent by weight platinum on charcoal, was charged into a pressure vessel. Hydrogen, under a pressure of 1500 p.s.i., was fed into the vessel as the vessel was vibrated. After about 5 minutes the pressure in the vessel dropped to 1200 p.s.i. The hydrogen pressure was then increased to 1500 p.s.i. and this step repeated until no further decrease in pressure was observed. The solution was then filtered and vacuum distilled to a solid residue.

Analysis:
  Number average molecular weight _____ 2000
  Melting point, ° C. _____ 75–80
  Percent internal unsaturation _____ 5

PREPARATION OF POLYMER G—PHENOLATED POLYISOPRENE

Into a two-liter flask equipped with a stirrer and reflux condenser, there was charged 602 grams of p-dodecylphenol and 40 grams of polyisoprene (Polymer A). To this mixture there was then added 10.4 grams of p-toluene sulfonic acid and the reaction then carried out in a manner described for Polymer B.

Analysis:
- Number average molecular weight _____ 2700.
- Melting point _____ 87° C.–92° C.
- Percent by weight combined p-dodecylphenol _ 23 based on the total weight of the isoprene polymer.
- Percent internal unsaturation _____ 5.

To samples of the masterbatch composition were added various amounts of isoprene polymers. Each isoprene polymer was dispersed in the sample of the masterbatch by a milling operation on a two-roll mill which had been preheated to a temperature of 80° C.–90° C. Each composition was sheeted on the two-roll mill and cut into strips, 1 inch by 6 inches by ⅛ of an inch. These strips were then used in the tack test previously described. The results of these tests are shown in Table I below.

Strips were also prepared from samples of this masterbatch composition to which no isoprene polymer was added in one case and to which a p-dodecylphenol-formaldehyde resole resin was added in a second case.

A second masterbatch composition, Masterbatch Composition II, was formulated using as the ethylene-propylene polymer, a copolymer of ethylene-propylene containing 58 percent by weight combined ethylene and 42 percent by weight combined propylene. To this masterbatch was then added various isoprene polymers and the resultant com-

TABLE I

| Polymer | Parts by weight polymer based on the weight of ethylene-propylene polymer | Tested for Tack | | |
|---|---|---|---|---|
| | | 1 day | 3 days | 30 days |
| 1, Polymer A | 15 | Good tack | Good tack | Very good tack. |
| 2, Polymer B | 10 | Very good tack | Very good tack | Very good tack. |
| 3, Polymer B | 15 | Excellent tack | Excellent | Excellent tack. |
| 4, Polymer B | 20 | Strips were nonseparable | Strips were nonseparable | Strips were nonseparable. |
| 5, Polymer F | 15 | Good tack | Good tack | Good tack. |
| 6, Polymer G | 10 | Very good tack | Very good tack | Very good tack. |
| 7, Control 1 | 15 | No tack | No tack | No tack. |
| 8, Control 2 | 10 | ___do___ | ___do___ | No tack. |
| 9, Control 3 | 20 | ___do___ | ___do___ | Do. |
| 10, Control 4 (phenol-formaldehyde resin) | 15 | Slight tack | Slight tack | Slight tack. |
| 11, Control 5 (no additive) | 0 | No tack | No tack | No tack. |

Control 1.—Polyisoprene having a number average molecular weight of over 100,000 and an internal unsaturation of 99 percent.

Control 2.—Polyisoprene having a number average molecular weight of 3500 and an internal unsaturation of 60 percent.

Control 3.—Polyisoprene having a number average molecular weight of 4100 and an internal unsaturation of 90 percent.

A masterbatch composition, whose formulation is noted below, was compounded to a blend in a Banbury mixer.

Masterbatch Composition II:                Parts by weight
- Copolymer of ethylene-propylene _____ 100
- Carbon black _____ 45
- Calcium stearate _____ 1
- Zinc oxide _____ 5
- Naphthenic oil _____ 5
- Dicumyl peroxide _____ 2.6
- Sulfur _____ 0.3

TABLE II

| Polymer | Parts by weight polymer based on the weight of ethylene-propylene polymer | Tested for Tack | | |
|---|---|---|---|---|
| | | 1 day | 3 days | 30 days |
| 12, Polymer A | 15 | Good tack | Good tack | |
| 13, Polymer B | 10 | Very good tack | Very good tack | |
| 14, Polymer B | 15 | Excellent tack | Excellent tack | Excellent tack. |
| 15, Polymer B | 20 | Strips were non-separable | Strips were non-separable | Strips were non-separable. |
| 16, Polymer F | 15 | Good tack | Good tack | Good tack. |
| 17, Polymer G | 10 | Very good tack | Very good tack | Very good tack. |

Masterbatch Composition I:                Parts by weight
- Terpolymer of ethylenepropylene-1,4-hexadiene containing 52 percent by weight combined ethylene, 48 percent by weight combined propylene with the remainder being 1,4-hexadiene _____ 100
- Zinc oxide _____ 5
- Stearic acid _____ 1
- Carbon black _____ 80
- Naphthenic oil _____ 40
- Sulfur _____ 1.5
- Tetramethylthiuran monosulfide _____ 1.5
- 2-mercaptobenzothiazole _____ 0.75

As previously pointed out, the compositions of this invention not only have have significantly better tack than do compositions containing presently known "tackifiers" such as p-dodecyl phenol-formaldehyde resole resin, but, in addition, the physical properties of the compositions of this invention compare favorably with the physical properties of compositions containing these presently known tackifiers. This is established by the data of Table III below. The compositions of Table III were formulated by adding to samples of Masterbatch Composition I various amounts of isoperne polymers and p-dodecyl phenol-formaldehyde resole resin.

Eighty grams of each composition so formulated were formed into plaques 6 inches by 6 inches and cured, under a pressure of 750 p.s.i., for 30 minutes, at a temperature of 154° C. Tests were then conducted as indicated in Table III.

Each composition was also formed into strips and tested for tack in a manner as previously described.

the data of Table IV wherein compositions tested were prepared using Masterbatch Composition I and various polymers of isoprene.

Polymer H was a phenolated copolymer of isoprene-butadiene-1,4, the copolymer having an average number molecular weight of about 2000; internal unsaturation of

TABLE III

| Polymer | Parts by weight polymer based on the weight of ethylene-propylene polymer | Tested for Tack | | | Tensile modulus, ASTMD-412, p.s.i. | Tensile strength, ASTMD-412, p.s.i. |
| --- | --- | --- | --- | --- | --- | --- |
| | | 1 day | 3 days | 30 days | | |
| 18-p-dodecylphenol-formaldehyde resole resin | 10 | Fair tack | Fair tack | No tack | 752 | 2,755 |
| 19, Polymer B | 15 | Excellent tack | Excellent tack | Excellent tack | 756 | 3,005 |

TABLE IV

| Polymer | Parts by weight polymer based on the weight of ethylene-propylene polymer | Tested for Tack | | |
| --- | --- | --- | --- | --- |
| | | 1 day | 3 days | 30 days |
| 20, Polymer B | 8 | Good tack | Good tack | Good tack. |
| 21, Polymer B | 12 | Excellent tack | Excellent tack | Excellent tack. |
| 22, Polymer C | 15 | do | do | Do. |
| 23, Polymer D | 10 | Very good tack | Very good tack | Very good tack. |
| 24, Polymer E | 20 | Strips were non-separable | Strips were non-separable | Strips were non-separable. |
| 25, Polymer H | 10 | Very good tack | Very good tack | Very good tack. |
| 26, Polymer I | 15 | Excellent tack | Excellent tack | Excellent tack. |
| 27, Polymer J | 15 | do | do | Do. |

A particularly desirable property of compositions of this invention, as previously stated, is their cohesive strength. Determination of cohesive strength was made by evaluation of the stress-strain properties of these compositions using a table model Instron tester. The strain versus percent elongation to rupture was plotted and the area under the curves obtained, calculated. The area under each curve is directly proportional to the energy required to rupture each specimen. The test is further described in a Technical Bulletin by Shell Chemical Company, Synthetic Rubber Division, SCR: 66.166.

Compositions tested were prepared by adding to 100 grams of Masterbatch Composition I various amounts of isoprene polymers. The compositions were then formed into strips 1 inch by 6 inches by 0.113 inch.

A control prepared in the same manner without any isoprene polymer was also tested. The stress-strain properties of each strip was determined operating the Instron tester under the following conditions:

Cross-head speed _____ inches/minute__ 5
Chart speed _____ do____ 5
Gauge length _____ inches__ 4

| | Percent by weight polymer based on the weight of ethylene-propylene polymer | Area Under Curve |
| --- | --- | --- |
| Polymer: | | |
| 0 | 0 | 44.34 inches². |
| Polymer B | 15 | 83.14 inches². |

As previously stated, polymers of isoprene and a copolymerizable monomer containing at least one olefinic double bond wherein the polymer contains at least about 70 percent by weight combined isoprene based on the weight of the polymer can also be used to achieve tack in ethylene-propylene polymers. This is substantiated by 10 percent and containing 90 percent by weight combined isoprene. This copolymer was prepared as follows:

Into a two-liter flask, equipped with an agitator and condenser, there was charged 1000 ml. of tetrahydrofuran which had been dried by being passed through a column of molecular sieves. To this solvent there was then added 0.130 mole of n-butyl lithium in 80 ml. of heptane and immediately thereafter a blend of 109 to 13 grams of isoprene-butadiene-1,4 was added to the contents of the flask over a 2 hour period. Prior to being charged into the flask, the blend of isoprene-butadiene-1,4 had been passed through a column of $Al_2O_3$. During the addition of the blend, the temperature of the contents of the flask was maintained at 0° C. and the system was continuously purged with nitrogen gas. After the addition of the blend, the temperature of the reaction mixture was raised to 60° C. and kept at 60° C. for a period of 2 hours. Methanol was then added to the flask and the copolymer of isoprene-butadiene-1,4 recovered as the methanol insoluble portion of the reacted mixture. The copolymer was stabilized with 0.05 gram of 2,6-di-t-butyl-4-methylphenol and then dried in a vacuum oven.

This copolymer was then phenolated with p-nonylphenol in a manner described for Polymer B.

Analysis:
  Number average molecular
    weight _____ 2400.
  Melting point _____ 85° C.–98° C.
  Percent by weight combined p-nonyl phenol __ 20 based on the total weight of the isoprene polymer.
  Internal unsaturation ____ 10.

Polymer I was a phenolated copolymer of isoprene-α-methylstyrene, the copolymer having an average number molecular weight of about 1800; an internal unsaturation of 5 percent and containing 90 percent by weight combined isoprene. This copolymer was prepared in a manner as described for Polymer H and phenolated with p-nonyl phenol as described for Polymer B.

Analysis:
- Number average molecular weight _____ 2300.
- Melting point _____ 75° C.–85° C.
- Percent by weight combined p-nonyl phenol __ 19 based on the total weight of the isoprene polymer.
- Internal unsaturation ____ 5.

Polymer J was a terpolymer of isoprene-α-methylstyrenebutadiene-1,4, the terpolymer having an average number molecular weight of about 1800; internal unsaturation of 5 percent and containing 85 percent by weight combined isoprene, 5 percent by weight α-methylstyrene and 10 percent by weight combined butadiene-1,4. This copolymer was prepared in a manner as described for Polymer H and phenolated with p-nonyl phenol as described for Polymer B.

Analysis:
- Number average molecular weight _____ 2200.
- Melting point _____ 90° C.–100° C.
- Percent by weight combined p - nonyl phenol _____ 18 based on the total weight of the isoprene polymer.
- Internal unsaturation __ 5.

The compositions of this invention have been described primarily with respect to being used in the manufacture of rubber tires for automobiles. In addition to being used for this application, the compositions can be utilized in the production of tapes, belts, footwear, tank-liners and the like.

Also, rather than utilizing the isoprene polymers as an additive to the ethylene-propylene polymers, the isoprene polymers can be dissolved in a solvent such as toluene, gasoline and the like to produce a solution having a solids content of about 10 percent by weight. This solution can thereafter be used to coat ethylene-propylene polymers with the result that the coated polymers exhibit excellent self-adhesion.

In another area of application, the isoprene polymers as a solution coating material can be used to coat, impregnate or similarly treat layers of cloth fabric, fibers or tapes which, when cured, have excellent adhesion to ethylene-propylene polymers. The coated material is excellently suited as a reinforcement in automobile tires.

In still another application, solid surfaces such as wood, metal, plastics, reinforced plastics and the like can be coated with solutions comprising ethylene-propylene polymers and isoprene polymers, which after removal of the solvent, provide a surface which is adherent to ethylene-propylene polymers either in the cured or uncured state.

The disclosure of all references herein is incorporated by reference.

What is claimed is:

1. A composition comprising an ethylene-propylene polymer which can be cured to an elastomeric product and a reaction product of a phenol having the formula R(OH)$_n$ wherein R is an aromatic hydrocarbon radical containing a maximum of 31 carbon atoms and $n$ is an integer having a value of 1 to 3 inclusive and an isoprene polymer which is a
   (1) homopolymer of isoprene, or
   (2) a polymer of isoprene and at least one monomer having at least one olefinic double bond, said polymer containing at least about 70 percent by weight combined isoprene
wherein said isoprene polymer has a number average molecular weight of about 500 to about 30,000 and contains less than about 50 percent by weight internal unsaturation, said reaction product having a combined phenol content of about 5 to about 75 percent by weight and being present in said composition in an amount sufficient to improve the tack thereof.

2. A composition as defined in claim 1 wherein said isoprene polymer has an average number molecular weight of about 500 to about 10,000 and which has less than about 20 percent by weight internal unsaturation.

3. A composition as defined in claim 2 wherein said isoprene polymer has a number average molecular weight of about 1000 to about 8000.

4. A composition as defined in claim 1 wherein the said isoprene polymer is a homopolymer of isoprene.

5. A composition as defined in claim 1 wherein said isoprene polymer is a polymer of isoprene and at least one monomer having at least one olefinic double bond.

6. A composition as defined in claim 1 wherein the ethylene-propylene polymer is a copolymer of ethylene and propylene.

7. A composition as defined in claim 1 wherein the ethylene-propylene polymer is an interpolymer of ethylene, propylene and a mono-olefinic unsaturated monomer.

8. A composition as defined in claim 1 wherein the ethylene-propylene polymer is a terpolymer of ethylene, propylene and a diene monomer.

9. A composition as defined in claim 1 wherein the said reaction product is a phenol phenolated isoprene homopolymer.

10. A composition as defined in claim 1 wherein the said reaction product is a p-nonylphenol phenolated isoprene homopolymer.

11. A composition as defined in claim 1 wherein the said reaction product is thiophenol phenolated isoprene homopolymer.

12. A composition as defined in claim 1 wherein the said isoprene polymer is a o-t-butylphenol phenolated isoprene homopolymer.

13. A composition as defined in claim 1 wherein the said reaction product is a p-dodecylphenol phenolated isoprene homopolymer.

14. A composition as defined in claim 1 wherein the said isoprene polymer is a copolymer of isoprene and butadiene-1,4.

15. A composition as defined in claim 1 wherein the said isoprene polymer is a copolymer is isoprene and α-methyl-styrene.

16. A composition as defined in claim 1 wherein the said isoprene polymer is an interpolymer of isoprene-α-methyl-styrene and butadiene-1,4.

17. A composition as defined in claim 1 wherein said reaction product is present in an amount of about 8 to about 100 percent by weight based on the weight of the ethylene-propylene polymer.

References Cited

UNITED STATES PATENTS

| | | | |
|---|---|---|---|
| 2,721,185 | 10/1955 | Schulze et al. | 260—894 |
| 2,932,622 | 4/1960 | Block | 260—4 |
| 3,110,699 | 11/1963 | Schmitz-Josten | 260—62 |
| 3,335,202 | 8/1967 | Guilio et al. | 260—889 |
| 3,343,582 | 9/1967 | Himes et al. | 260—889 |
| 3,380,952 | 4/1968 | Cluff et al. | 260—33.8 |
| 3,383,362 | 5/1968 | Gonzenbach | 260—62 |

MURRAY TILLMAN, Primary Examiner

M. J. TULLY, Assistant Examiner

U.S. Cl. X.R.

260—33.6, 62, 79.5, 80.7, 94.7

PO-1050
(5/69)

UNITED STATES PATENT OFFICE
CERTIFICATE OF CORRECTION

Patent No. 3,491,167          Dated January 20, 1970

Inventor(s) Anthony C. Soldatos

It is certified that error appears in the above-identified patent and that said Letters Patent are hereby corrected as shown below:

Column 12, line 38, for "isoprene polymer"
read -- reaction product --.

SIGNED AND
SEALED
JUN 23 1970

(SEAL)
Attest:

Edward M. Fletcher, Jr.
Attesting Officer

WILLIAM E. SCHUYLER, JR.
Commissioner of Patents